United States Patent [19]
Creason et al.

[11] Patent Number: 5,101,763
[45] Date of Patent: Apr. 7, 1992

[54] FRUIT WAXING SYSTEM

[75] Inventors: Kenneth C. Creason, Fillmore; John A. Salka, Santa Paula; Ralph R. Holland, Ventura, all of Calif.

[73] Assignee: Fillmore-Piru Citrus Association, Fillmore, Calif.

[21] Appl. No.: 216,848

[22] Filed: Jul. 8, 1988

Related U.S. Application Data

[60] Division of Ser. No. 217,236, Jul. 11, 1988, Pat. No. 4,842,880, which is a continuation of Ser. No. 76,782, Jul. 23, 1987, abandoned.

[51] Int. Cl.⁵ ............................................. B05C 13/02
[52] U.S. Cl. ..................................... 118/683; 118/16; 118/24
[58] Field of Search .............. 118/16, 24, 17, 30, 118/72, 314, 321, 683

[56] References Cited

U.S. PATENT DOCUMENTS

| | | | |
|---|---|---|---|
| 1,671,923 | 5/1928 | Brogden | 118/72 |
| 2,039,280 | 5/1936 | Brogden | 118/72 |
| 2,898,881 | 8/1959 | Straley | 118/24 |
| 3,279,423 | 10/1966 | Russell | 118/24 |
| 3,818,859 | 6/1974 | Kalmar | 118/24 |
| 4,465,714 | 8/1984 | Petro | 118/24 |
| 4,477,483 | 10/1984 | Lewis | 118/24 |

*Primary Examiner*—Willard Hoag
*Attorney, Agent, or Firm*—Gene W. Arant

[57] ABSTRACT

A system for applying a coating of wax and fungicide to the surface of fruit applies the coating in two stages. The first stage sprays onto the fruit a mixture of both wax and fungicide, while a second stage sprays onto the fruit wax alone. The fungicide is thereby concentrated immediately adjacent the fruit, where it is most effective in controlling fruit decay, and the wax is at its full concentration at the outside of the coating, where it can provide an optimum surface shine.

8 Claims, 1 Drawing Sheet

FRUIT WAXING SYSTEM

RELATED APPLICATIONS

This application is a division of our copending application Ser. No. 217,236 filed July 11, 1988, now U.S. Pat. No. 4,842,880 issued June 27, 1989; which was a continuation of our prior copending application Ser. No. 076,782 filed July 23, 1987, and now abandoned.

BACKGROUND OF THE INVENTION

This invention relates generally to the application of wax to the surface of fruit, and, more particularly, to the application of not only wax, but also fungicide.

It is customary in the packing of fruit for shipment in cartons to customers such as retail grocers, to apply a coating of wax to the fruit surface This provides the fruit with a desirable shiny appearance, which is of particular importance with citrus fruit. It also is customary to include with the wax a fungicide for controlling fruit decay. This is particularly important when the fruit are being shipped a considerable distance, such as across the country or overseas.

Fungicides used in the past for this purpose have typically been in an insoluble powder form. This powder has been suspended in liquid wax by agitation in a mixing tank, and this liquid mixture has then been sprayed onto the fruit as the fruit is moved along a conveyor past a spray station. Thus, the wax performs the dual function of serving as a binder for the insoluble fungicide powder and providing the fruit with the desirable shiny appearance.

Unfortunately, the fungicide and wax each tend to adversely affect the performance of the other. That is, increasing amount of fungicide in the liquid mixture increases the control of fruit decay, but simultaneously reduces shine. Conversely, decreasing the amount of fungicide in the mixture improves the surface shine, but reduces decay control. This problem is accentuated when the fungicide is in insoluble powder form.

It should therefore be appreciated that there is a need for an effective system for applying both wax and fungicide to the surface of fruit, which provides improved decay control while it simultaneously provides improved surface shine. The present invention fulfills this need.

SUMMARY OF THE INVENTION

The present invention is embodied in an apparatus, and related method, for applying a coating of both wax and fungicide to the surface of fruit, which provides not only enhanced control of fruit decay but simultaneously provides an improved surface shine. The apparatus includes conveyor means for transporting fruit along a path along with application means for applying both wax and fungicide onto the surfaces of the fruit, as they are being transported, to provide a surface coating of wax and fungicide. In accordance with the invention, the coating applied to the fruit has a substantially higher concentration of fungicide at its inside surface than at its outside surface, thereby providing improved control of fruit decay while simultaneously providing improved surface shine. These improved results can be achieved even when using reduced amounts of both fungicide and wax, thus leading to substantially reduced costs.

More particularly, the application means applies the coating to the fruit surfaces in two stages. In a first stage, a first liquid, consisting essentially of both liquid wax and fungicide, is sprayed onto the fruit. Thereafter, in a second stage, a second liquid, consisting essentially of wax alone, is sprayed onto the fruit. Thus, in the resulting coating, the fungicide is concentrated immediately adjacent the fruit surface, where it is most effective in controlling decay. In addition, the wax is at its full concentration at the outside of the coating, where it is most effective in providing the desirable shiny appearance.

In an optional, more detailed feature of the invention, the first and second liquids can each include different waxes. Thus, the wax included in the first liquid can be selected for its relatively low cost and for its properties in controlling fruit shrinkage and its effectiveness as a binder for the insoluble fungicide powder, while the wax included in the second liquid can be selected for its shine properties. The wax in the first liquid includes less expensive wax such as a wood resin wax, polyethylene wax or Carnauba wax, while the wax in the second liquid is preferably a high-shine shellac wax.

Controlling the relative proportions of wax applied by the respective first and second spraying stages also affects the degree of decay control and surface shine the apparatus provides. Using the first spraying stage to apply 60 to 90 percent of the total amount of wax applied in the two spraying stages together, provides particularly effective decay control and surface shine. Preferably, 70 percent of the total wax is applied in the first spraying stage.

Other features and advantages of the present invention will become apparent from the following description of the preferred embodiment, taken in conjunction with the accompanying drawing, which illustrates, by way of example, the principles of the invention.

BRIEF DESCRIPTION OF THE DRAWING

The figure is a diagramatic view of an apparatus for applying both wax and fungicide to the surface of fruit.

DESCRIPTION OF THE PREFERRED EMBODIMENT

Figure 1:
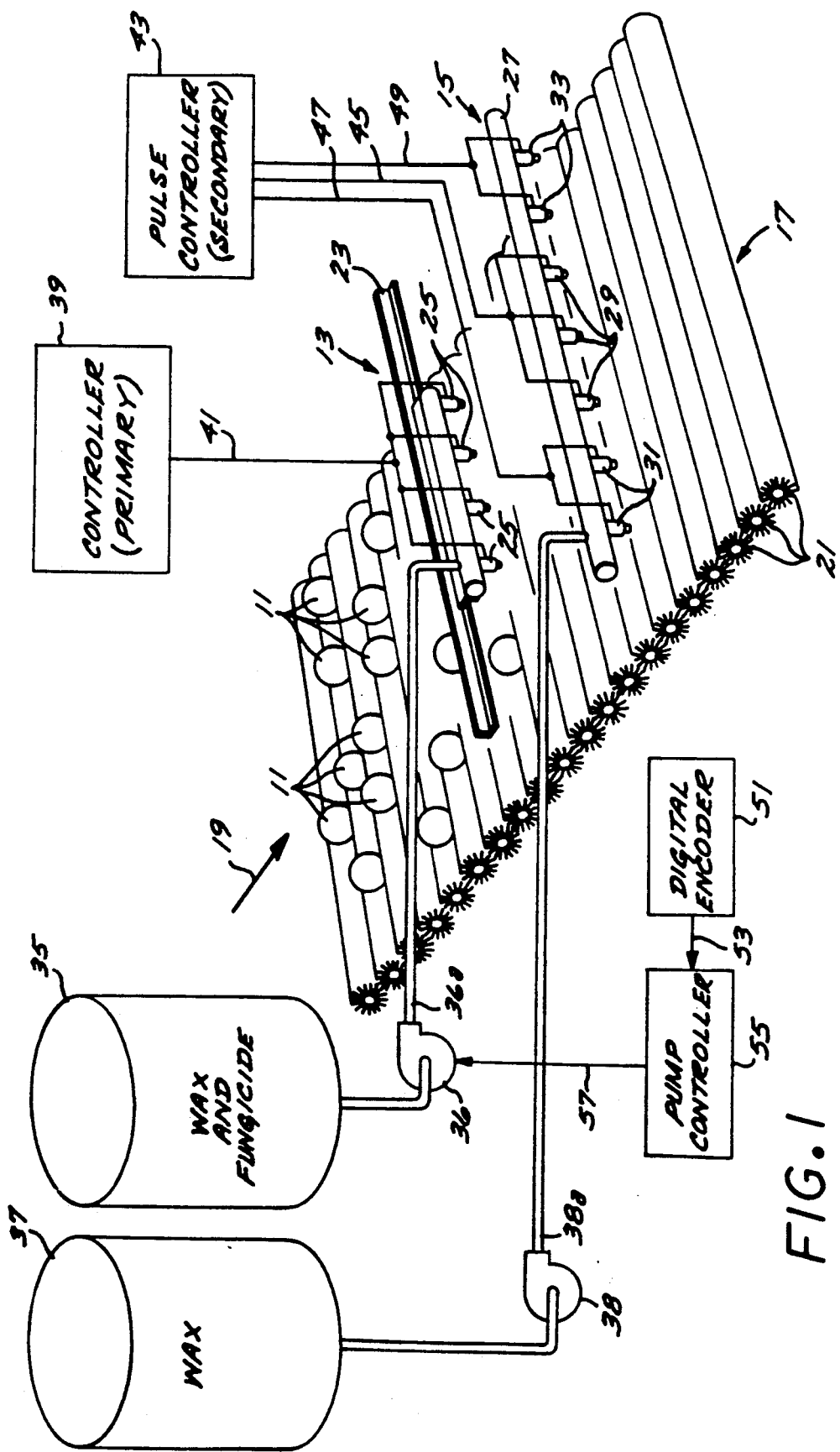

With reference now to the drawing, there is shown an apparatus for applying a coating of both wax and fungicide to the exterior surfaces of fruit 11, particularly citrus fruit. The coating is applied to the fruit before it is packed in cartons for shipment to customers such as retail grocers. The wax provides the fruit with a shiny surface appearance, which customers find desirable, and the fungicide aids in the control of fruit decay, which can be a particular problem when the fruit is being shipped across the country or overseas.

The wax and fungicide are sprayed in liquid form onto the fruit 11 by primary and secondary overhead spray assemblies 13 and 15, respectively, as the fruit are moved along on a conventional brush bed conveyor 17. The direction of fruit travel along the conveyor is indicated by the reference numeral 19. This conveyor includes a succession of closely-spaced transversely-oriented cylindrical brushes 21 that all rotate in a forward direction, to advance the fruit past the spray assemblies. Both sprayer assemblies spray liquids downwardly onto the portions of the fruit oriented upwardly and onto the conveyor brushes, which spread the sprayed liquid uniformly over the fruit surface.

The primary spray assembly 13 includes an elongated frame 23 oriented transversely to the direction of fruit travel 19 and further includes a number of nozzles 25 for spraying a primary liquid downwardly onto the conveyor 17 and the advancing fruit 11. In the depicted apparatus, the primary sprayer assembly frame is arranged to oscillate transversely relative to the conveyor so as to cover the conveyor's entire width.

The secondary sprayer assembly 15 likewise includes an elongated frame 27 oriented transversely to the direction of fruit travel 19 and further includes three sets of nozzles 29, 31 and 33 for spraying a secondary liquid downwardly onto the conveyor 17 and advancing fruit 11. The secondary sprayer assembly is depicted as being of sufficient width to cover the entire conveyor without the need for any oscillating transverse movement.

In accordance with the invention, the primary liquid sprayed by the primary sprayer assembly 13 includes both wax and fungicide, while the secondary liquid sprayed by the secondary sprayer assembly 15 includes wax alone. As a result, the greatest concentration of fungicide occurs at the inside of the coating, adjacent the fruit 11, where it most effectively can control fruit decay. In addition, the outside portion of the coating contains a full concentration of wax, thus providing an improved surface shine.

The wax that is sprayed by the primary spray assembly 13 is in liquid form, but the fungicide sprayed along with it is normally in an insoluble powder form. A mixing tank 35 is therefore provided with means for agitating the mixture and suspending the fungicide uniformly in the wax. A primary pump 36 then pumps the agitated mixture through a conduit 36a to the primary spray assembly, for spraying onto the conveyor 17 and fruit 11.

The wax that is to be sprayed by the secondary spray assembly 15 likewise is in liquid form. A secondary pump 38 pumps the liquid from a tank 37 through a conduit 38a directly to the secondary sprayer assembly, for spraying onto the conveyor 17 and fruit 11.

The relative amounts of wax applied by the respective primary and secondary sprayer assemblies 13 and 15 can be selected so as to adjust the degree of decay control and surface shine the apparatus provides. If a greater proportion of the total applied wax is applied by the primary sprayer assembly, improved decay control can be achieved, but with reduced surface shine. Conversely, if a lesser proportion of the total applied wax is applied by the primary sprayer assembly, decreased decay control is achieved, but with improved surface shine. This, of course, presupposes a fixed concentration of the fungicide in the wax applied by the primary sprayer assembly. In any case, the use of two sprayer assemblies in accordance with the invention can provide the same degree of decay control and surface shine as is provided by prior waxing systems, but with substantially reduced quantities of wax.

Tests have shown that applying 60 to 90 percent of the total wax using the primary sprayer assembly 13 leads to the most satisfactory combination of decay control and surface shine for citrus fruit. Seventy percent is ordinarily the preferred level, although this percentage can vary according to the ripeness of the fruit 11 being coated.

Since the wax and fungicide coating is applied to the fruit 11 using two separate sprayer assemblies 13 and 15, the waxes applied by the two assemblies can be of different kinds. The waxes, of course, must be compatible with each other.

The wax applied by the primary sprayer assembly 13 is preferably selected on the basis of its cost as well as its properties in serving as an effective binder of the fungicide and in controlling fruit shrinkage. Using this criteria, carnauba wax or any other lower-shine waxes such as wood resin and polyethylene waxes are preferred. These waxes are usually available as a mixture with a shellac wax.

The wax applied by the secondary sprayer assembly 15 is preferably selected solely for the surface shine it provides. High-quality shellac waxes are preferred.

Many fungicides are suitable for use in the primary liquid sprayed by the primary sprayer assembly 13. These include thiabendazole (TBZ) and benomil, which are both available in powder form. A primary liquid including either of these two fungicides is opaque and, by itself, does not provide a good surface shine for the fruit. The two fungicides are ordinarily used in concentrations of 3500–5000 ppm and 1500–2000 ppm, respectively, although these concentrations can vary according to the fruit's ripeness and the stage of the growing season.

A third suitable fungicide, imazalil, forms a translucent solution when it is mixed with wax. When used in a concentration of about 2000 ppm, the resulting primary liquid can provide a good surface shine, even without application of a further coating of wax alone. If desired, some amount of imazalil can be included in the secondary liquid sprayed by the secondary sprayer assembly 15.

The spraying effected by the primary sprayer assembly 13 is controlled by a controller 39, via a control line 41. In particular, the controller causes the spray nozzles 25 to spray the wax and fungicide mixture continuously onto the conveyor 17 and fruit 11 as the assembly oscillates transversely relative to the conveyor. The assembly typically oscillates at a speed such that it completes one entire cycle in about three or four seconds. This provides a substantially uniform spray coverage across the conveyor's entire width. Alternatively, the controller can pulse the spray nozzles of the primary spray assembly at a selected rate and duty cycle.

The secondary sprayer assembly 15 is controlled by a pulse controller 43, via three separate control lines 45, 47 and 49. Each separate control line controls the pulsing of a separate set of spray nozzles 29, 31 or 33, respectively. One set 29 includes three nozzles carried at the center of the assembly frame 27, and the other two sets 31 and 33 each include two separate nozzles located at opposite ends of the frame. Separate solenoids are preferably located adjacent to each nozzle.

The controller 43 ordinarily pulses all three sets of nozzles 29, 31 and 33 at the same rate and duty cycle. This rate and duty cycle are ordinarily selected to be high enough to ensure that the brushes 21 of the conveyor remain continuously coated with wax. An operator (not shown in the drawing) can selectively cause one or both of the two side sets of nozzles 31 and 33 to spray additional wax onto the conveyor and fruit 11 if he sees a higher than expected concentration of fruit near the conveyor edges.

The density or throughput of fruit 11 being moved past the sprayer assemblies 13 and 15 by the conveyor 17 is usually somewhat variable. To account for this variation, it is usually desirable to correspondingly modify the rate at which wax and fungicide are applied by the primary sprayer assembly 13. The primary pump 36 is therefore adapted to pump the primary liquid at one of three different pressures (and thus flow rates), in accordance with the fruits' throughput.

A digital encoder 51 is therefore included to monitor the speed of a belt (not shown) that delivers fruit 11 to the apparatus. This encoder outputs a signal on line 53 whose frequency is proportional to the belt's speed. A pump controller 55 frequency divides the pulse signal and compares the resultant signal with several rate thresholds, to determine which of several different speed ranges is occurring. In accordance with this determination, the controller outputs an appropriate pump control signal on line 57, to drive the primary pump 36 at an appropriate speed. Thus, when the fruit are being delivered to the apparatus at a relatively high rate, the pump is operated at a high pressure and the primary spray assembly 13 sprays the primary liquid at a correspondingly high rate. Conversely, when the fruit are being delivered at a relatively low rate, the pump is operated at a low pressure and the primary liquid is sprayed at a correspondingly low rate.

It should be appreciated from the foregoing description that the present invention provides an improved apparatus for applying a wax and fungicide coating to the surface of fruit. By applying initially a mixture of both fungicide and wax and, subsequently, wax alone, a coating can be provided with a higher concentration of fungicide adjacent to the fruit, where it is most effective in controlling fruit decay, and with a maximum concentration of wax at the outside of the coating, where it can provide an optimum surface shine.

Although the invention has been described in detail with reference to the presently preferred embodiment, those of ordinary skill in the art will appreciate that various modifications can be made without departing from the invention. Accordingly, the invention is defined only by the following claims.

We claim:

1. Apparatus for applying a coating of fungicide and wax to the surface of fruit in order both to protect it from decay and to provide a shiny surface appearance, comprising:

conveyor means including plural parallel brushes rotating in the same direction to advance fruit along a desired path transversely of axes of the brushes;

reservoir means for holding a supply of a first liquid consisting of liquid wax within which an insoluble fungicidal material in powder form is uniformly suspended;

primary sprayer means disposed transversely above said conveyor means;

primary pump means coupling said reservoir means to said primary sprayer means for continuously spraying said first liquid onto the upwardly oriented portions of the fruit and onto the conveyor brushes;

storage means for providing a second liquid consisting essentially of a shellac wax;

secondary sprayer means disposed transversely above said conveyor means in down-stream relationship to said primary sprayer means;

secondary pump means coupling said storage means to said secondary sprayer means for spraying said second liquid onto the fruit and the conveyor brushes; and pump controller means for controlling the operation of said primary pump means in accordance with the rate at which fruit is being supplied to said conveyor means, such that said primary sprayer means applies from 60 to 90 percent of the total amount of wax that is applied to the fruit, and the fungicidal material to protect the fruit from decay is concentrated near the surface of the fruit while the wax applied from said second liquid provides a shiny surface appearance for the fruit.

2. Apparatus as in claim 1 wherein said pump controller means is automatically responsive to the rate at which fruit is being supplied to said conveyor means for selectively increasing or decreasing the rate at which said first liquid is applied to the fruit.

3. Apparatus as in claim 1 wherein said primary sprayer means extends less than the full transverse width of said conveyor means, and which further includes a primary controller operable for driving said primary sprayer means in a lateral oscillating movement so as to spray said first liquid across the full width of said conveyor means.

4. Apparatus as in claim 1 which further includes pulse controller means for operating said secondary sprayer means in accordance with selected duty cycles.

5. Apparatus as in claim 4 wherein said secondary sprayer means includes separate sets of spray nozzles which are laterally spaced apart, and said pulse controller means includes means for manual selection of differing duty cycles for said separate sets of nozzles.

6. Coating apparatus for applying a coating of wax and fungicide to the surface of fruit, comprising:

conveyor means for transporting fruit along a generally linear path;

means for providing a first liquid consisting essentially of both wax and fungicide;

separate means for providing a second liquid consisting essentially of wax; and application means for applying both wax and fungicide to the surfaces of the fruit as they are transported by the conveyor means, including primary sprayer means for spraying the first liquid onto the fruit, and secondary sprayer means spaced along said path from said first sprayer means for spraying the second liquid onto the fruit, after the first sprayer means has sprayed the first liquid onto the fruit, each of said primary and secondary sprayer means including a linear array of spray nozzles arranged transversely relative to the conveyor means, and a sprayer assembly frame supporting said primary array of spray nozzles and arranged to oscillate transversely relative to the conveyor so as to cover the entire width of the conveyor; and controller means for independently controlling said secondary array of spray nozzles such that the spray nozzles therein located nearest each edge of the conveyor means and the spray nozzles therein located nearest the center of the conveyor means spray selected amounts of the second liquid;

so as to provide a coating of wax and fungicide on the fruit surfaces wherein the coating has a substantially higher concentration of fungicide at its inside surface than at its outside surface, thereby providing an effective control of fruit decay while simultaneously providing an effective surface shine.

7. Coating apparatus as defined in claim 6 which includes a primary controller controlling said primary array of spray nozzles so as to spray onto the fruit about 70 percent of the total wax.

8. Coating apparatus for applying a coating of wax and fungicide to the surface of citrus fruit, comprising:

conveyor means including a plurality of closely-spaced, transverse brushes for transporting citrus fruit along a path;

means for mixing a first liquid consisting essentially of both wax and fungicide, the wax including at least one of a wood resin wax, a polyethylene wax, and a carnauba wax;

means for providing a second liquid consisting essentially of a shellac wax;

primary sprayer means for spraying the first liquid onto the fruit;

secondary sprayer means for spraying the second liquid onto the fruit;

said primary and secondary sprayer means each including a linear array of spray nozzles arranged transversely relative to the conveyor means, and said secondary sprayer means being spaced along said path from said first sprayer means for spraying the second liquid onto the fruit after the first sprayer means has sprayed the first liquid onto the fruit; and wherein the wax and fungicide coating applied to the fruit by the first and second sprayer means has a substantially higher concentration of fungicide at its inside surface than at its outside surface, thereby providing an effective control of fruit decay while simultaneously providing an effective surface shine.

* * * * *